United States Patent
Weidlich

[11] 3,915,748
[45] Oct. 28, 1975

[54] ALUMINUM ANODE FOR BIOGALVANIC METAL-OXYGEN CELLS

[75] Inventor: Erhard Weidlich, Erlangen, Germany

[73] Assignee: Siemens Aktiengesellschaft, Munich, Germany

[22] Filed: July 15, 1974

[21] Appl. No.: 488,837

[30] Foreign Application Priority Data
July 16, 1973 Germany............................ 2336119

[52] U.S. Cl....... 136/86 A; 136/120 R; 136/120 FC
[51] Int. Cl.².................. H01M 27/04; H01M 29/02
[58] Field of Search......... 136/120 R, 86 A, 120 FC

[56] References Cited
UNITED STATES PATENTS

| | | |
|---|---|---|
| 2,708,683 | 5/1955 | Eisen.............................. 136/120 R |
| 2,796,456 | 6/1957 | Slokes............................ 136/120 R |
| 2,805,274 | 9/1957 | Eisen.............................. 136/120 R |

Primary Examiner—John H. Mack
Assistant Examiner—H. A. Feeley
Attorney, Agent, or Firm—Kenyon & Kenyon Reilly Carr & Chapin

[57] ABSTRACT

An aluminum anode for biogalvanic metal-oxygen calls comprising a metal screen having layers of aluminum on both sides of said screen, wherein the outer surfaces of said aluminum layers are finely ground and provided with an anodized layer on a marginal area of said outer surface sufficient to provide an active surface.

6 Claims, 2 Drawing Figures

ALUMINUM ANODE FOR BIOGALVANIC METAL-OXYGEN CELLS

BACKGROUND OF THE INVENTION

The invention is concerned with an improved aluminum anode for biogalvanic metal-oxygen cells.

Biogalvanic metal-oxygen cells, which generally comprise a consumable metal anode and a catalyst-oxygen cathode, have been heretofore used as current sources for devices implanted in the human body such as heart pacers (see Biomedical Engineering, Vol. 9, No. 3, March 1974, Pages 98–103). In the German Offenlegungschrift 2,039,519 a metal-oxygen cell is described, in which the metal anode is located inside the cell and a porous cathode forms at least part of the wall of the housing enclosing the cell. The anode of this cell consists preferably of high-purity aluminum having an impurities content of at most 0.1 percent by weight chiefly to prevent the development of hydrogen. The cathode consists of porous silver as a rule. Tests have shown that aluminum anodes used heretofore still have certain disadvantages. In particular, the aluminum anode is occasionally subjected to uneven oxidation in the electrochemical reaction occurring in the metal-oxygen cell. Corrosion often takes place at the edge of the electrode, which is presumably caused by the cold-working that takes place during its manufacture In addition, the shank of the electrode sometimes corrodes prematurely. It has furthermore been found that pitting and passivation by hydroxide layers and also charge losses due to the development of hydrogen at the aluminum anode can occur.

The instant invention alleviates these problems by providing an improved aluminum anode which resists premature passivation and pitting, reduces the development of hydrogen, reduces charge losses, and prevents premature corrosion of the outer zones of the electrode.

It is an object of this invention to provide an improved aluminum anode for bio-galvanic metal-oxygen cells.

It is a further object of this invention to provide an anode having increased service life and improved Faraday efficiency by suppressing the development of hydrogen.

These and other objects are accomplished according to this invention by an aluminum anode comprising a metal screen having a layer of aluminum on both sides of the metal screen. The outer surfaces of the aluminum layer (that is the surfaces facing away from the metal screen) are lapped or sandblasted to form finely ground surfaces and are provided with an anodized layer at a portion of their outer surfaces.

By virtue of the surface treatment of the aluminum layers, i.e., by lapping or sand-blasting, the aluminum surface is consumed uniformly and premature passivation of the electrode is prevented during operation of the cell. The surface treatment also prevents contamination which can lead to pitting. In addition, the development of hydrogen and the charge losses connected therewith can be reduced in this manner. By anodizing the outer surfaces premature corrosion is also prevented. The use of a metal screen, to which aluminum is applied in layers on both sides, assures a reliable and durable contact with the anode. The metal screen preferably consists of silver; however titanium and tantalum can also be used. Screens of titanium and tantalum can additionally be provided with a layer of a metal carbide or nitride. It can be insured in this manner that the mechanical stability of such screens is not affected by hydrogen that might be present. For the construction of the anode, the two aluminum layers are pressed on the metal screen and the anode is then cast-over with epoxy resin at the edge.

The two aluminum layers of the anode according to the invention can advantagesouly be provided with openings, which extend from one surface of the aluminum layer to the other. In this manner the possibility exists for the electrolyte to pass through the anode and thereby equalizes shifts in pH value, since variations in the pH value can also lead to the development of hydrogen. This is especially true in so-called double-chamber cells, in which the anode is arranged as a partition in the center of a symmetrically designed, chamber-like cell and the two outside walls parallel to the anode are designed as cathodes. The openings provide the further advantage that pressure equalization is possible in the anode because a pressure difference is produced by uneven hydrogen development on both sides of the anode.

In order to ensure a uniform pH value at all points of the aluminum surface, the anode can additionally be enclosed with a membrane, preferably made of polyvinyl alcohol. The membrane may also consist of a polyvinyl alcohol and polyacrylic acid mixture.

The invention will be explained in further detail with reference to the figures.

DETAILED DESCRIPTION OF THE PREFERRED EMBODIMENT

Figure 1:
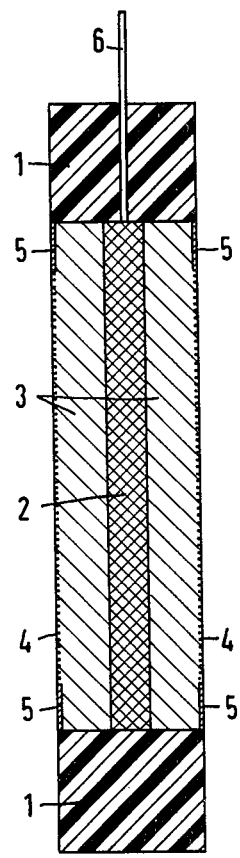
In FIG. 1, a cross section through one embodiment of the aluminum anode is shown according to the invention; and In FIG. 2, a cross section through another embodiment of the invention shows added features such as a membrane and passage openings in the aluminum layers.

In FIG. 1, the anode shown is made of pure aluminum with an aluminum content of, for example, 99.99 percent. The aluminum discs 3 with a diameter of 36 mm are stamped out of a sheet of aluminum of about 1 mm thickness. A silver screen 2 wire thickness: 0.12 mm; mesh size: about 220/cm$^2$) of 36 mm diameter is inserted between the two aluminum discs; the screen is provided with a silver lug 6 of about 1 cm$^2$ for conducting current. The pressing is subsequently carried out with a pressure of about 44 to 48 N/mm$^2$, (Approxi. 440 to 480 Kg/cm$^2$) after which an electrode is obtained with a diameter of about 40 mm. For better adhesion of the aluminum discs 3 to the silver screen 2, the former can be lapped, prior to the pressing, on the side which comes to lie against the screen.

After the pressing operation the electrode is clamped into a mold and is cast at the edge with epoxy resin 1. After the epoxy resin has set, the electrode is anodized, i.e., is coated with a thin oxide layer by anodic oxidation. The anodizing can be performed by the sulfuric-acid d-C process (GS Process). The anodizing time is generally about half an hour, and subsequently the oxide film produced is post-densified for about half an hour. The anodized layer obtained is about 10 to 15 $\mu$m thick. After the anodizing, the electrode is lapped or sand-blasted except for a margin of about 2 mm wide, on which the anodized layer 5 remains intact, so that an active surface 4 is obtained. The lapping of the electrode surface, which is understood to be a very fine grinding process, can be done with corundum in an oil emulsion; subsequently, it can be cleaned in an ultrasonic bath. The sand-blasting of the surface can also be done with corundum.

Figure 2:
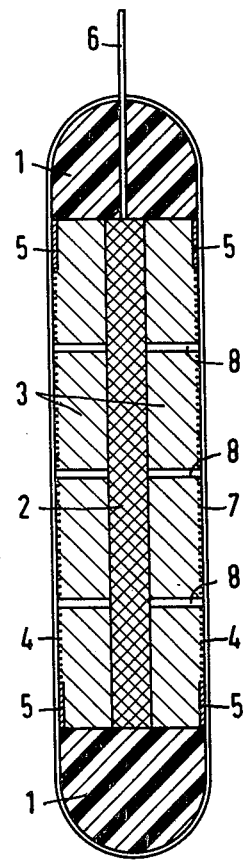

In FIG. 2, a further embodiment of the aluminum anode according to the invention is shown in cross section. Similar parts are provided here with the same reference numerals as in FIG. 1. As compared to the embodiment according to FIG. 1, the plastic frame 1 is rounded in this anode and the anode is enclosed in a membrane 7. The aluminum layers 3 are provided with passage openings 8.

An aluminum anode according to the invention can advantageously be used, for instance, in a biogalvanic metal-oxygen cell with an oxygen-permeable silicon rubber membrane enclosing the cell, a metal anode, two oxygen cathodes with silver screens which are arranged on both sides of this anode and on which catalytically active material is placed, and electrolyte chambers between the anode and the cathodes. In this cell the metal anode is connected at the margin with a plastic frame which, for purposes of developing the electrolyte chambers, is wider than the metal anode. The silver screens of the cathodes are free of catalytically active material in the marginal areas and the marginal areas of the silver screens are extended over the plastic frame and are connected with each other. The silicone rubber membrane encloses the cathodes and the marginal areas of the silver screens closely and a jacket of silicone rubber is applied on the part of the silicone rubber membrane which encloses the marginal areas of the silver screens. Such a cell is described in U.S. Patent application Ser. No. 488,839, "Biogalvanic Metal-Oxygen Cell", filed July 15, 1974. tests in vitro under conditions similar to those in the body showed that the losses due to hydrogen development can be kept below 1 percent. With a quantity of 5g of aluminum, an operating life of about 10 years can therefore be obtained.

In the operation of the biogalvanic cell at 38°C in a physiological NaCl solution and a partial oxygen pressure of 100 millibar, a power of 240 $\mu$W was obtained with a load resistance of 2.35 kohms and a cell voltage of 750 mV. The maximum power output is at a current density of 55 $\mu$A/cm$^2$ and a cell voltage of 450 mV.

What is claimed is:

1. An aluminum anode for biogalvanic metal-oxygen cells comprising a metal screen having layers of aluminum on both sides of said screen wherein the outer surfaces of said layers of aluminum are finely ground to provide active surfaces and provided with an anodized layer on a marginal areas of said outer surfaces.

2. The aluminum anode of claim 1 wherein said metal screen is a silver screen.

3. The aluminum anode of claim 1 wherein said layers of aluminum are provided with openings extending through said layers.

4. The aluminum anode of claim 1 wherein said anode is enclosed with a membrane.

5. The aluminum anode of claim 4 wherein said membrane is made from polyvinyl alcohol or a polyvinyl alcohol and polyacrylic acid mixture.

6. A metal/oxygen cell containing as an anode therefor, the aluminum anode of claim 1.

* * * * *